US008635364B2

(12) United States Patent
Yoshida

(10) Patent No.: US 8,635,364 B2
(45) Date of Patent: Jan. 21, 2014

(54) APPARATUS CONTROL SYSTEM AND APPARATUS CONTROL METHOD

(75) Inventor: Yukinori Yoshida, Tokyo (JP)

(73) Assignee: NEC ViewTechnology, Ltd., Minato-Ku, Tokyo (JP)

( * ) Notice: Subject to any disclaimer, the term of this patent is extended or adjusted under 35 U.S.C. 154(b) by 986 days.

(21) Appl. No.: 11/602,364

(22) Filed: Nov. 21, 2006

(65) Prior Publication Data

US 2007/0174423 A1 Jul. 26, 2007

(30) Foreign Application Priority Data

Jan. 23, 2006 (JP) ................................. 2006-013728

(51) Int. Cl.
*G06F 15/173* (2006.01)
*G06F 15/177* (2006.01)

(52) U.S. Cl.
USPC .......................................... 709/238; 709/220

(58) Field of Classification Search
USPC .................. 709/220, 221, 238, 242
See application file for complete search history.

(56) References Cited

U.S. PATENT DOCUMENTS

| | | | | |
|---|---|---|---|---|
| 5,590,284 | A * | 12/1996 | Crosetto | 712/29 |
| 6,107,937 | A * | 8/2000 | Hamada | 340/825.69 |
| 7,395,126 | B2 * | 7/2008 | Decker | 700/65 |
| 2003/0028657 | A1 * | 2/2003 | Thunquest et al. | 709/230 |
| 2003/0142679 | A1 * | 7/2003 | Okagawa et al. | 370/397 |
| 2004/0215773 | A1 * | 10/2004 | Strait et al. | 709/225 |
| 2005/0027794 | A1 | 2/2005 | Decker | |
| 2006/0010385 | A1 * | 1/2006 | Sasaki | 715/718 |
| 2006/0112171 | A1 * | 5/2006 | Rader | 709/218 |
| 2006/0161639 | A1 * | 7/2006 | Kato | 709/219 |
| 2006/0253874 | A1 * | 11/2006 | Stark et al. | 725/62 |

FOREIGN PATENT DOCUMENTS

| | | |
|---|---|---|
| JP | 04-007935 | 1/1992 |
| JP | 09-107367 | 4/1997 |
| JP | 2001-308936 | 11/2001 |
| JP | 2002-218080 | 8/2002 |
| JP | 2003-044661 | 2/2003 |
| JP | 2004-064128 | 2/2004 |

OTHER PUBLICATIONS

Chinese Office Action dated Apr. 10, 2009 with an English language translation.
Japanese Office Action dated Oct. 7, 2009 (with partial English translation).

* cited by examiner

*Primary Examiner* — Brian J Gillis
(74) *Attorney, Agent, or Firm* — McGinn IP Law Group, PLLC

(57) ABSTRACT

An apparatus control system comprises a first and a second device located on a network, and a PC for transmitting a remote manipulation instruction to the first device. The first device executes a corresponding operation in accordance with the remote manipulation instruction from the PC, and redirects the remote manipulation instruction from the PC to the other device on the network. The second device executes a corresponding operation in accordance with the remote manipulation instruction redirected by the first device.

20 Claims, 8 Drawing Sheets

RELATED ART

APPARATUS CONTROL SYSTEM AND APPARATUS CONTROL METHOD

This application is based upon and claims the benefit of priority from Japanese Patent Application No. 2006-13728, filed in the Japanese Patent Office on Jan. 23, 2006, the contents of which are hereby incorporated by reference.

BACKGROUND OF THE INVENTION (1) Field of the Invention

The present invention relates to a system and method for remotely manipulating a plurality of devices which exist on a network.

(2) Description of the Related Art

There have been proposed systems which are capable of remotely manipulating a plurality of devices which exist on a network. JP-A-2003-44661 describes a system which is capable of remotely manipulating a plurality of devices on a network from a terminal. having a browsing function as represented by a personal computer (hereinafter called the "PC" in abbreviation).

FIG. 1 illustrates an exemplary configuration of an apparatus control system which utilizes a browsing function for remote manipulations. Referring to FIG. 1, this apparatus control system comprises devices 130, 140, each located on network 101 and equipped with an HTTP server function, and personal computer (PC) 102 which comprises a web browser. PC 102 can access an HTTP server of each device 130, 140 by initiating the web browser installed therein. PC 102 is also equipped with functions for remotely manipulating devices 130, 140.

For remotely manipulating devices 130, 140 in the apparatus control system described above, the web browser is initiated on PC 102 to perform manipulations for connecting PC 102 to devices 130, 140, respectively. As a manipulation is performed for connecting to device 130, web browser screen 131 is displayed on display 102a in order to remotely manipulate device 130. As an operator makes an entry for a remote manipulation on web browser screen 131, the web browser issues instruction 132 which reaches device 130 through network 101. Upon receipt of instruction 132, device 130 performs a corresponding operation. On the other hand, as a manipulation is performed for connecting to device 140, web browser screen 141 is displayed on display 102a in order to remotely manipulate device 140. As the operator makes an entry for a remote manipulation on web browser screen 141, the web browser issues instruction 142 which reaches device 140 through network 101. Upon receipt of instruction 142, device 140 performs a corresponding operation.

A form of utilization may be contemplated in which a plurality of devices on a network are caused to substantially and simultaneously perform the same operation through remote manipulations. However, in the aforementioned apparatus control system, when each device 130, 140 is caused to perform the same operation through remote manipulations, the operator is required to repeatedly perform the manipulation for making a connection by using the web browser and by using the entry for the remote manipulation for each of devices 130, 140. Such repetitions of the same manipulations for each device are tedious for the operator, and involve complicated manipulations if there are a large number of devices.

In addition, since a plurality of web browser screens are simultaneously displayed on display 102a, complicated web browser screens are displayed which cause a degradation in operability.

Also, since remote manipulation is performed on a device-by-device basis, it is difficult to remotely manipulate respective devices substantially and simultaneously in association with one another.

SUMMARY OF THE INVENTION

It is an object of the present invention to provide an apparatus control system which is capable of solving the foregoing problems, and causing a plurality of devices on a network to substantially simultaneously perform the same operation through a single remote manipulation.

To achieve the above object, an apparatus control system of the present invention includes a plurality of devices located on a network, and a controller that transmits a remote manipulation instruction to at least one of the plurality of devices through the network. The system is characterized in that at least one device comprises a remote manipulation instruction processing unit that executes a corresponding operation in accordance with the remote manipulation instruction from the controller, and redirects the remote manipulation instruction from the controller to the other device or other devices on the network, and the other device or other devices execute a corresponding operation in accordance with the remote manipulation instruction from the remote manipulation instruction processing unit.

According to the foregoing configuration, at least one device executes a corresponding operation in accordance with a remote manipulation instruction from the controller, and redirects the remote manipulation instruction to the other device or other devices. The other device or other devices execute a corresponding operation in accordance with the redirected remote manipulation instruction. In this way, since the remote manipulation instruction from the controller is supplied to the other device or other devices through at least one device, a plurality of devices can be caused to substantially and simultaneously perform the same operation through a single remote manipulation. In this event, the operator is required to perform only a remote manipulation for one device, and does not have to perform remote manipulations for other devices.

Consequently, according to the present invention, a plurality of devices on a network can be caused to substantially and simultaneously perform the same operation through a single remote manipulation.

Also, according to the present invention, since other device or other devices can be remotely manipulated, no need exists to change the destination of a web browser on a PC or to newly launch a web browser on the PC, resulting in a corresponding simplification of the manipulation procedure for the remote manipulation.

Further, since a plurality of web browser screens are not displayed simultaneously on a display, complicated web browser screens will not be displayed, leading to improved operability.

The above and other purposes, features, and advantages of the present invention will become apparent from the following description with reference to the accompanying drawings which illustrate examples of the present invention.

DETAILED DESCRIPTION OF THE PREFERRED EMBODIMENTS

Figure 2:
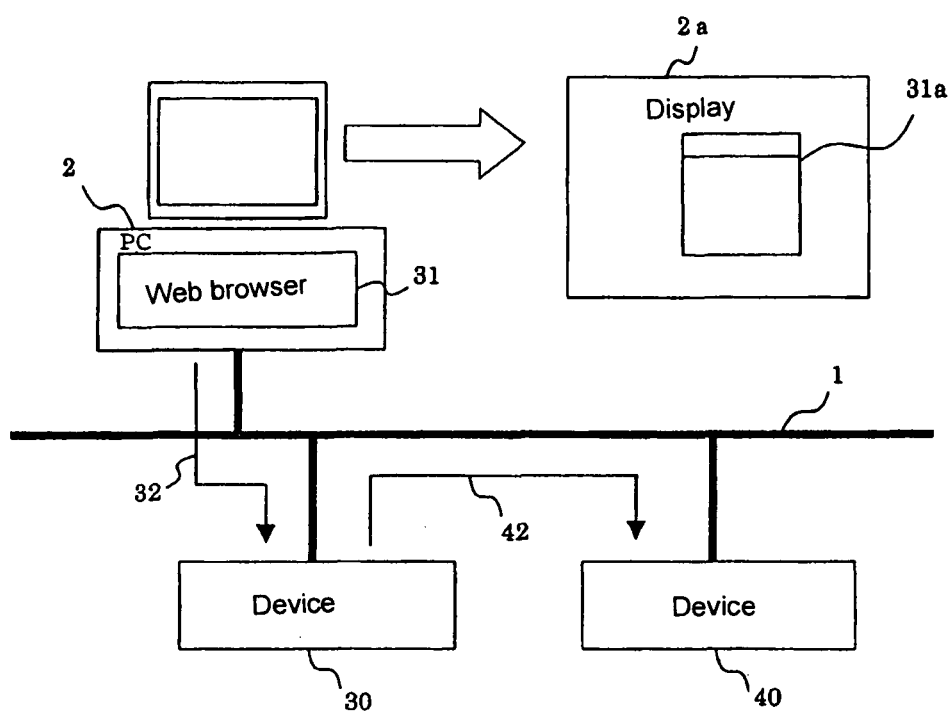
FIG. 2 is a block diagram generally illustrating the configuration of an apparatus control system in one aspect of the present invention.

FIG. 2 is a block diagram generally illustrating the configuration of an apparatus control system in one aspect of the present invention. Referring to FIG. 2, the apparatus control system in this aspect comprises devices 30, 40, each located on network 1 and equipped with an HTTP server function, and personal computer (PC) 2 installed with web browser 31.

Figure 1:
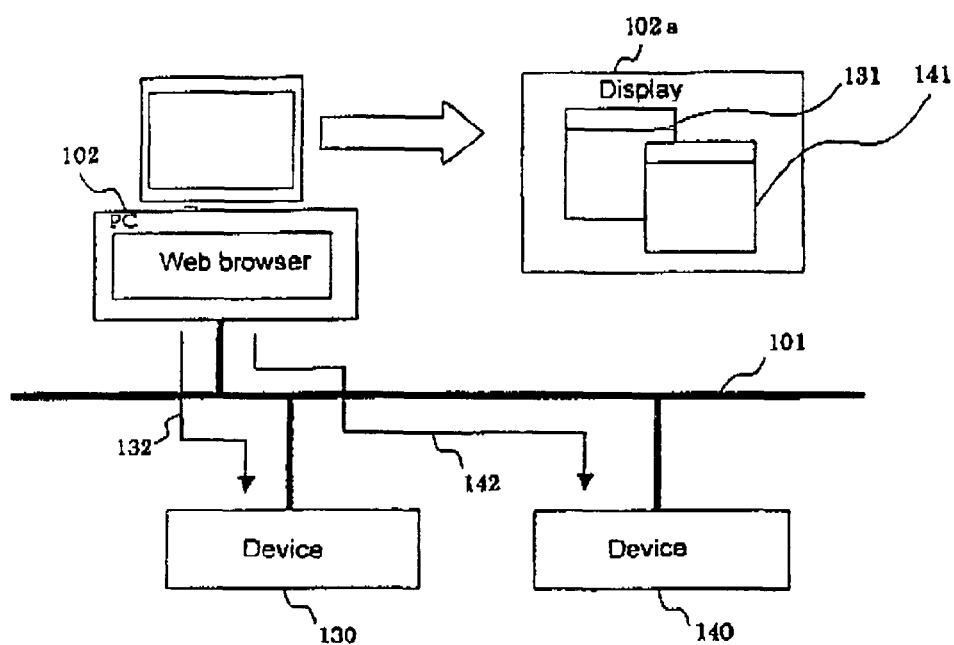
FIG. 1 is a block diagram illustrating the configuration of a conventional apparatus control system which utilizes a browsing function for remote manipulations.

Network 1 conforms to TCP (Transmission Control Protocol)/IP (Internet Protocol). Device 30 is assigned an IP address "192.168.10.10," while device 40 is assigned an IP address "192.168.10.11." The apparatus control system illustrated in FIG. 2 is basically similar in configuration to the conventional apparatus control system illustrated in FIG. 1, except that device 30 is configured to redirect instructions from web browser 31 to another device.

In the apparatus control system of this aspect, when devices 30, 40 are caused to perform the same operation through a remote manipulation, an operator launches web browser 31 on PC 2 and performs a manipulation for connecting PC 2 to device 30. In response to the manipulation for connection to device 30, web browser screen 31a is displayed on display 2a of PC 2 in order to remotely manipulate device 30. As the operator makes an entry on web browser screen 31a for remote manipulation, web browser 31 issues instruction 32 which reaches device 30 through network 1.

Upon receipt of instruction 32 from PC 2, device 30 executes the requested operation in accordance with received instruction 32, and redirects this instruction 32 to device 40 as instruction 42. Instruction 42 transmitted from device 30 reaches device 40 through network 1. Upon receipt of instruction 42 from device 30, device 40 executes the requested operation in accordance with received instruction 42.

According to the sequence of the foregoing operations, devices 30, 40 can be caused to substantially and simultaneously perform the same operation through a single remote manipulation.

Also, since the remote manipulation of device 40 does not involve changing the destination of web browser 31 on PC 2, or again launching web browser 31 on PC 2, the manipulation procedure can be correspondingly simplified to solve the problem of complicated manipulations (problem of tedious manipulations).

In addition, since the function for redirecting a remote manipulation instruction to another device can be implemented by partially modifying an existing web browser or an HTTP server function, an expensive dedicated application need not be installed in PC 2 to remotely manipulate a plurality of devices. In this connection, some existing systems have a dedicated application installed in PC's that cause a plurality of devices to simultaneously perform the same operation through a remote manipulation, but, such a dedicated application is expensive and causes an increase in the system cost.

Furthermore, device 40 merely receives instruction 42 from device 30, so that this device 40 need not be equipped with a function for redirecting instructions from PC 2 to another device (i.e., function for redirecting remote manipulation instruction). Accordingly, an existing device (i.e., obsolete device which does not have the function for redirecting remote manipulation instructions) can be used for device 40.

In the following, specific examples will be given for describing the configuration of the apparatus control system in the aforementioned aspect.

[First Embodiment]

An apparatus control system according to a first embodiment of the present invention is characterized in that, in the configuration illustrated in FIG. 2, device 30 has a redirection list which registers IP addresses of devices to which remote manipulation instructions should be redirected, and the apparatus control system is configured to redirect remote manipulation instructions from web browser 31 to the IP addresses registered in the redirection list.

Figure 3:
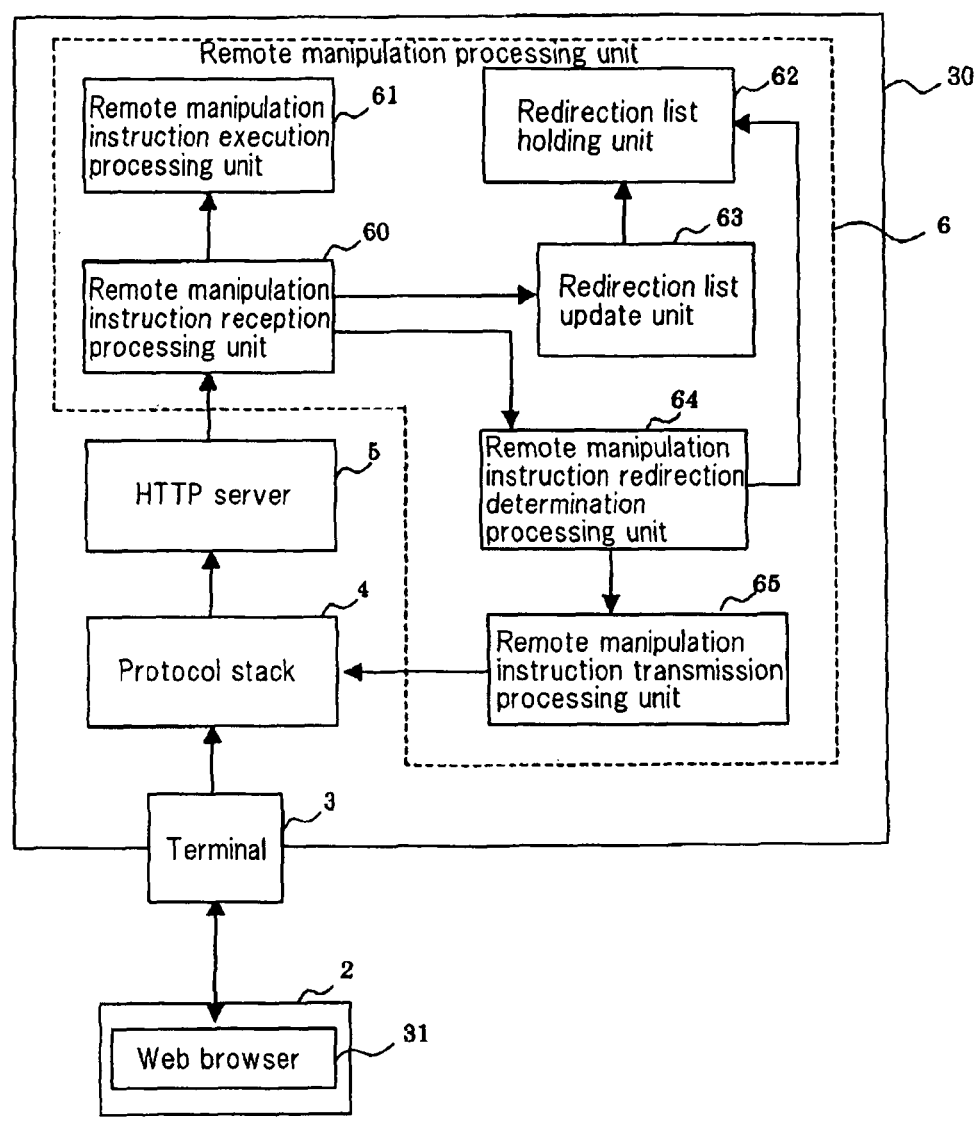
FIG. 3 is a block diagram illustrating an exemplary configuration of a device which forms part of the apparatus control system, according to a first embodiment of the present invention.

FIG. 3 illustrates an exemplary configuration of device 30. Device 30 illustrated in FIG. 3 may be a television receiver set which supports a network connection, and comprises terminal 3 for connecting to network 1, protocol stack 4 for transmitting and receiving packets through network 1, HTTP server 5 which can be accessed by web browser 31, and remote manipulation processing unit 6 for generally performing remote manipulation processing. The remote manipulation processing includes, for example, processing to switch from one channel to another through channel-up or channel down.

Remote manipulation processing unit 6 comprises remote manipulation instruction reception processing unit 60 for receiving a remote manipulation instruction contained in a received packet, remote manipulation instruction execution processing unit 61 for performing an operation that corresponds to the received remote manipulation instruction, redirection list holding unit 62 for holding a list of devices to which the received remote manipulation instruction should be redirected, redirection list update unit 63 for updating redirection list holding unit 62, remote manipulation instruction redirection determination processing unit 64 for determining whether or not the remote manipulation instruction should be redirected to another device with reference to redirection list 62, and remote manipulation instruction transmission processing unit 65 for transmitting the remote manipulation instruction to the other device through protocol stack 4.

Figure 4:
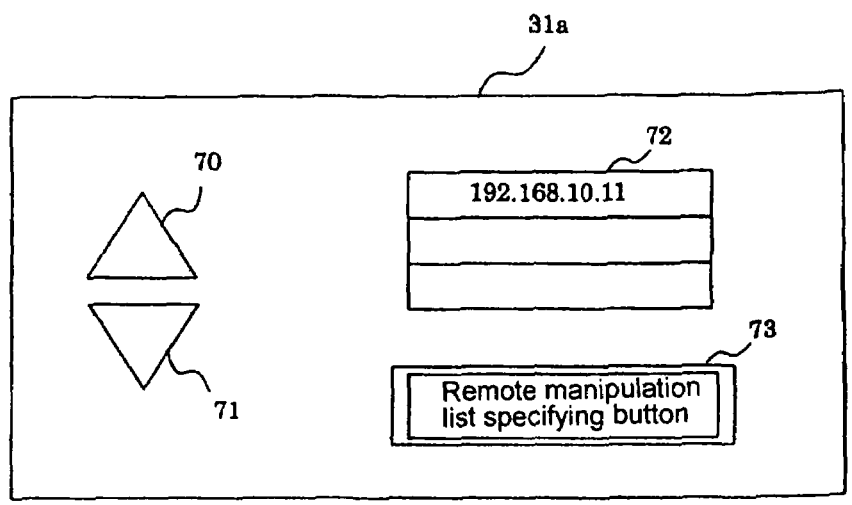
FIG. 4 is a schematic diagram illustrating an example of a web browser screen displayed in the apparatus control system in the first embodiment of the present invention.

FIG. 4 illustrates an example of web browser screen 31a which is displayed when web browser 31 is launched to connect PC 2 to HTTP server 5 in device 30. This web browser screen 31a, which is a screen for remote manipulation, comprises channel-up button 70 to scroll up, channel-down button 71 to scroll down, remote manipulation list 72 for entering an IP address of another device which is remotely manipulated simultaneously with device 30, and remote manipulation list specifying button 73 for reproducing remote manipulation list 72 to device 30.

As the operator depresses remote manipulation list specifying button 73, after registering remote manipulation list 72 with an IP address of another device (here, the IP address of device 40) which is remotely manipulated simultaneously with device 30, web browser 31 transmits to device 30 a packet which contains a remote manipulation instruction that corresponds to remote manipulation list specifying button 73 (a remote manipulation list specifying instruction for reproducing the IP address of the other device registered in remote manipulation list 72 to redirection list holding unit 62 in device 30). Also, as the operator depresses channel-up button 70 or channel-down button 72 on web browser screen 31a, web browser 31 transmits to device 30 a packet which contains a remote manipulation instruction that corresponds to channel-up button 70 or channel-down button 71.

Figure 5:
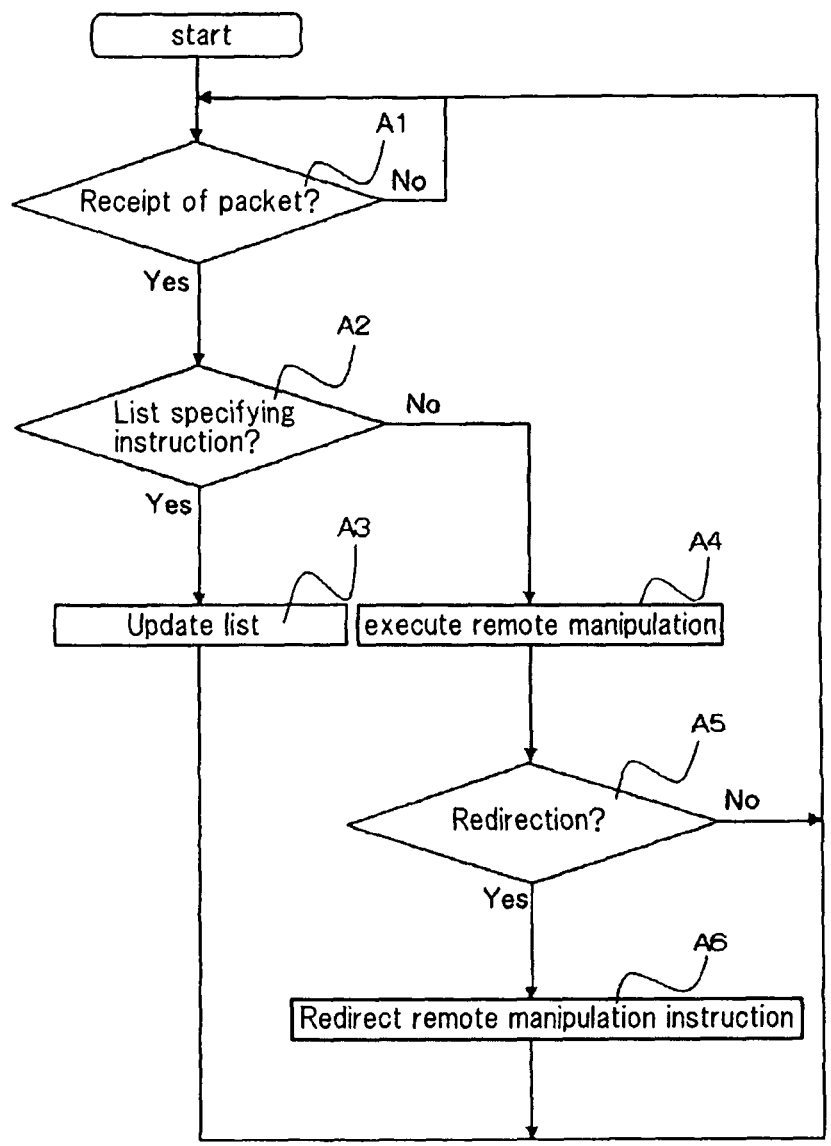
FIG. 5 is a flow chart illustrating a procedure of remote manipulation processing performed in the device illustrated in FIG. 3.

FIG. 5 illustrates a procedure of remote manipulation processing in device 30 when it receives a remote manipulation instruction from web browser 31. In the following, remote manipulation processing in device 30 will be specifically described with reference to FIGS. 2 to 5.

Assume herein that web browser 31 has already been connected to HTTP server 5 on device 30. A remote manipulation instruction from web browser 31 is supplied to remote manipulation instruction reception processing unit 60 through HTTP server 5, where remote manipulation instruction reception processing unit 60 is monitoring for packets received from web browser 31 at all times (step A1).

To require devices 30, 40 to perform the same operation, the operator registers the IP address "192.168.10.11" of device 40 in remote manipulation list 72 on web browser screen 31a, and then depresses remote manipulation list specifying button 73. As the operator depresses remote manipulation list specifying button 73, web browser 31 transmits to device 30 a packet which contains a remote manipulation instruction that corresponds to remote manipulation list specifying button 73 (instruction for reproducing the IP address "192.168.10.11" of device 40 registered in remote manipulation list 72 to redirection list holding unit 62 in device 30). This packet is supplied to remote manipulation instruction reception processing unit 60 through HTTP server 5.

Upon receipt of a packet from web browser 31 ("Y" at step A1), remote manipulation instruction reception processing unit 60 analyzes the contents of the remote manipulation instruction contained in the received packet, and determines whether or not it is a remote manipulation list specifying instruction (step A2). Here, since the remote manipulation instruction contained in the received packet is the remote manipulation list specifying instruction, "Yes" is determined at step A2. When the determination at step A2 is "Yes," remote manipulation instruction reception processing unit 60 invokes redirection list update unit 63, such that redirection list update unit 63 updates the contents of redirection list holding unit 62 in accordance with the remote manipulation list specifying list (step A3). After the update, the procedure returns to step A1.

After specifying the remote manipulation list, the operator depresses channel-up button 70 or channel-down button 71 on web browser screen 31a. Assume herein that channel-up button 70 is depressed. As channel-up button 70 is depressed, web browser 31 transmits to device 30 a packet which contains a remote manipulation instruction that corresponds to channel-up button 70.

Upon receipt of the packet from web browser 31 ("Y" at step A1), remote manipulation instruction reception processing unit 60 analyzes the contents of the remote manipulation instruction contained in the received packet to determine at step A2 whether or not it is a remote manipulation list specifying instruction. Here, since the remote manipulation instruction contained in the received packet is a remote manipulation instruction that corresponds to channel-up button 70, "No" is determined at step A2. When the determination at step A2 is "No," remote manipulation instruction reception processing unit 60 invokes remote manipulation instruction execution processing unit 61, such that remote manipulation instruction execution processing unit 61 executes a channel-up operation in accordance with the remote manipulation instruction (step A4). Subsequently, remote manipulation instruction reception processing unit 60 invokes remote manipulation instruction redirection determination processing unit 64, such that remote manipulation instruction redirection determination processing unit 64 confirms the contents of redirection list holding unit 62 (step A5). Here, since the IP address "192.168.10.11" of the device has been registered in the redirection list, "Yes" is determined at step A5. When the determination at step A5 is "Yes," remote manipulation instruction redirection determination processing unit 64 invokes remote manipulation instruction transmission processing unit 65, such that remote manipulation instruction transmission processing unit 65 transmits the same remote manipulation instruction as the remote manipulation instruction received by remote manipulation instruction reception processing unit 65 to the IP address registered in the redirection list through protocol stack 4 (step A6). After transmission of the remote manipulation instruction, the procedure returns to step A1.

When no IP address of another device is registered in the redirection list ("No" at step A5), the procedure returns to step A1 without any further processing.

In this embodiment, device 40 comprises terminal 3, protocol stack 4, HTTP server 5, remote manipulation instruction reception processing unit 60, and remote manipulation instruction execution processing unit 61 in the configuration illustrated in FIG. 3, where remote manipulation instruction execution processing unit 61 executes a corresponding operation (channel-up or channel-down) in accordance with the remote manipulation instruction from web browser 31, which has been redirected thereto by device 30.

[Second Embodiment]

An apparatus control system according to a second embodiment of the present invention is characterized in that, in the configuration illustrated in FIG. 2, PC 2 transmits to device 30 a redirection list which registers IP addresses of devices to which remote manipulation instructions should be redirected, such that device 30 redirects a remote manipulation instruction from the web browser with reference to the IP addresses registered in the redirection list received from PC 2.

Figure 6:
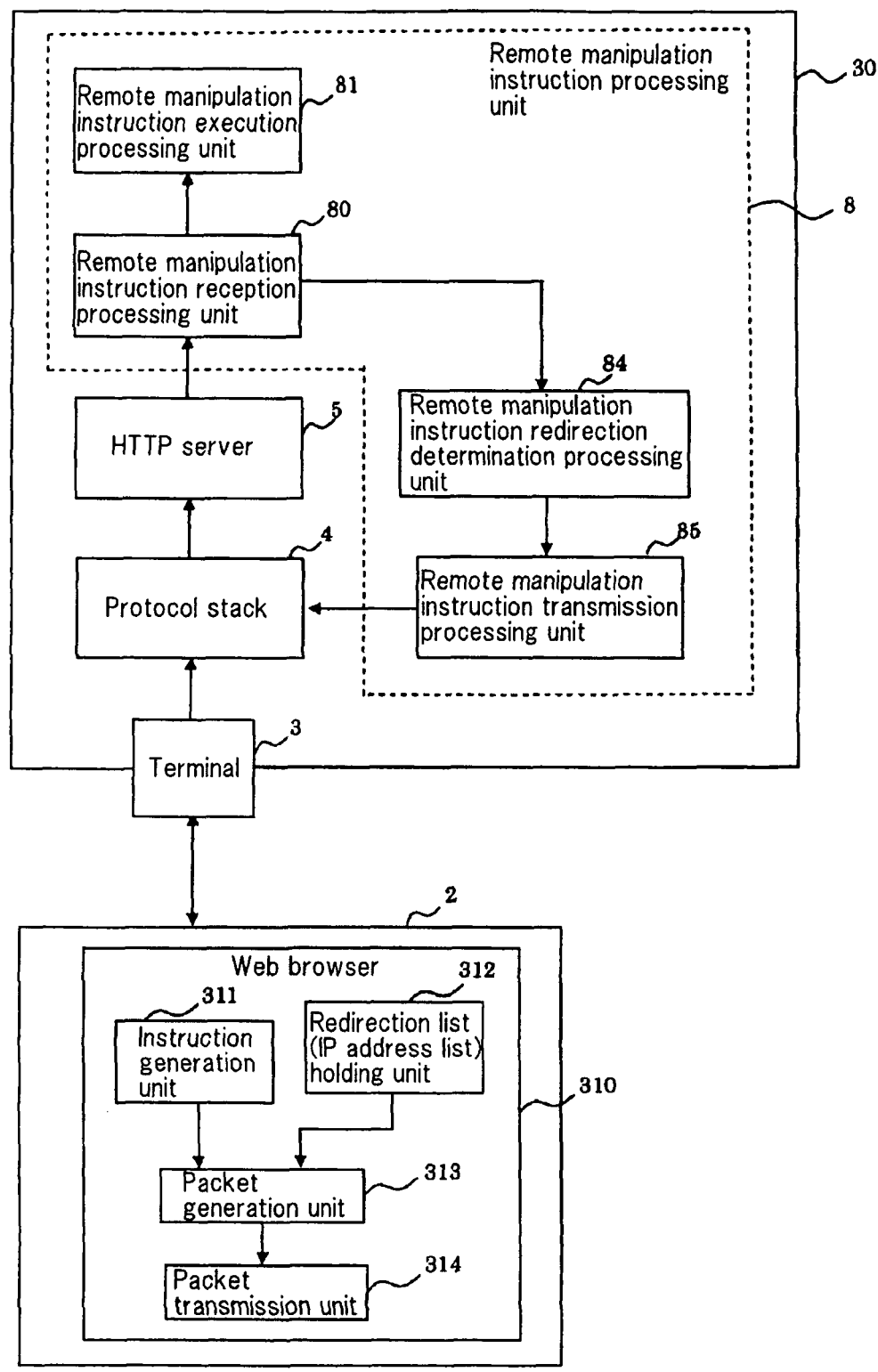
FIG. 6 is a block diagram illustrating an exemplary configuration of a device and a personal computer which form part of the apparatus control apparatus, according to a second embodiment.

FIG. 6 illustrates an exemplary configuration of device 30 and PC 2. Referring to FIG. 6, device 30 is identical to the configuration illustrated in FIG. 8, except that remote manipulation instruction processing unit 8 is substituted for remote manipulation instruction processing unit 6. Remote manipulation instruction processing unit 8 comprises remote manipulation instruction reception processing unit 80 for receiving a remote manipulation instruction contained in a received packet, remote manipulation instruction execution processing unit 81 for performing an operation that corresponds to the received remote manipulation instruction, remote manipulation instruction redirection determination processing unit 84 for determining whether or not the remote manipulation instruction should be redirected to another device with reference to a redirection list contained in the received packet, and remote manipulation instruction transmission processing unit 85 for transmitting the remote manipulation instruction to the other device through protocol stack 4.

PC 2 has web browser 310. Web browser 310 comprises instruction generation unit 311, redirection list (IP address list) holding unit 312, packet generation unit 313, and packet transmission unit 314. The layout of a web browser screen displayed in response to the launch of web browser 310 is the same as the web browser screen illustrated in FIG. 4.

Instruction generation unit 311 is responsive to the operator who depresses the channel-up button or channel-down button on the web browser screen to generate an instruction (remote manipulation instruction) that corresponds to the depressed button. Redirection list holding unit 312 is a component for holding IP addresses of other devices which have been registered in a remote manipulation list on the web browser screen, and which are remotely manipulated simultaneously with device 30. As the operator enters a desired IP address in the remote manipulation list and depresses the remote manipulation list specifying button on the web browser screen, redirection list holding unit 312 holds the entered IP address in the redirection list.

Figure 7:
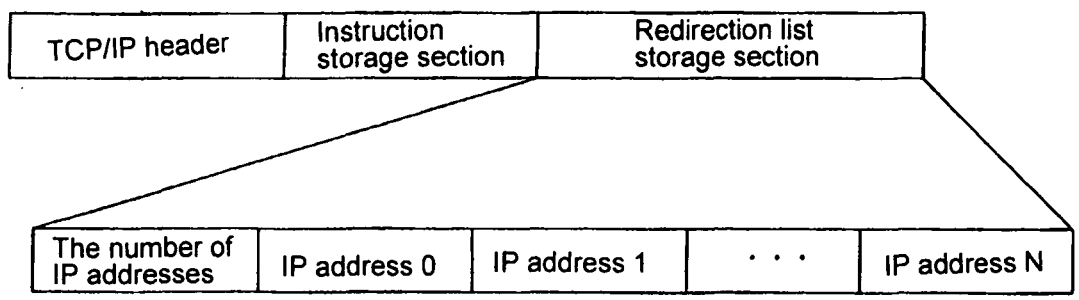
FIG. 7 is a schematic diagram showing the structure of a packet for use in the apparatus control system illustrated in FIG. 6.

Packet generation unit 313 creates a packet based on the instruction (remote manipulation instruction) generated by instruction generation unit 311 and the IP address list held in redirection list holding unit 312. FIG. 7 shows the structure of the packet. This packet is for use in TCP/IP communications, and comprises a TCP/IP header, an instruction storage section, and a redirection list storage section. The redirection list storage section comprises a first area for specifying the number of IP addresses held in the redirection list, and also comprises a second area, following the first area, for storing the IP address list including "IP address 0"-"IP address N." Packet generation unit 313 stores an instruction (remote manipulation instruction) generated by instruction generation unit 311 in the instruction storage section, and confirms whether or not a redirection list is held in redirection list holding unit 312. When no redirection list is held in redirection list holding unit 312, packet generation unit 313 stores "0" in the first area (number of IP addresses) of the redirection list storage section. When a redirection list is held in redirection list holding unit 312, packet generation unit 313 stores the number of IP addresses in the IP address list in the first area (number of IP addresses) of the redirection list storage section, and stores the IP address list in the second area of the redirection list storage section.

Packet transmission unit 314 transmits the packet generated by packet generation unit 313 to device 30.

Next, a description will be given of the operation of the apparatus control system in this embodiment.

As the operator depresses remote manipulation list specifying button 73, after registering remote manipulation list 72 with the IP address of another device (here, the IP address of device 40) which is remotely manipulated simultaneously with device 30 on the web browser screen, redirection list holding unit 312 in web browser 310 holds the registered IP address of device 40 in a redirection list.

As the operator subsequently depresses the channel-up button or channel-down button on the web browser screen regarding device 30, instruction generation unit 311 in web browser 310 generates an instruction (remote manipulation instruction) that corresponds to the depressed button. Next, packet generation unit 313 stores the instruction (remote manipulation instruction) generated by instruction generation unit 311 in the instruction storage section, stores "1" in the first area (number of IP addresses) of the redirection list storage section in the packet, and stores the redirection list held in the redirection list holding unit 312 in the second area. Then, packet transmission unit 314 transmits the packet generated by packet generation unit 313 to device 30.

In device 30, the packet from web browser 310 is received by HTTP server 5 through terminal 3 and protocol stack 4. Remote manipulation instruction reception processing unit 80 analyzes the contents of the remote manipulation instruction contained in the packet received by HTTP server 5, and causes remote manipulation instruction execution processing unit 81 to execute an operation in accordance with the remote manipulation instruction.

Next, remote manipulation instruction reception processing unit 80 invokes remote manipulation instruction redirection determination processing unit 84, such that remote manipulation instruction redirection determination processing unit 84 determines whether or not an IP address list is stored in the redirection list storage section in the received packet. When the IP address list is stored in the redirection list storage section, remote manipulation instruction redirection determination processing unit 84 invokes remote manipulation instruction transmission processing unit 85. Then, remote manipulation instruction transmission processing unit 85 transmits the same remote manipulation instruction as the remote manipulation instruction received by remote manipulation instruction reception processing unit 80 to the IP address stored in the redirection list storage section through protocol stack 4. On the other hand, when no IP address list is stored in the redirection list storage section in the received packet (when "0" is stored in the first area of the redirection list storage section), remote manipulation instruction reception processing unit 80 does not redirect the remote manipulation instruction.

According to the apparatus control system of the embodiment described above, a plurality of devices on a network can be caused to substantially and simultaneously perform the same operation through a single remote manipulation. The same operation performed by the respective devices can include a variety of operations in addition to the channel-up and channel-down scrolling. An exemplary application will be given below.

In this exemplary application, single TV (television) receiver set A, which represents device 30, and three TV receiver sets B-D, which represent device 40, are located on network 1. TV receiver sets A-D can be selectively applied with a first video signal related to an image of trees, and a second video signal related to a jigsaw puzzle.

Figure 8A:
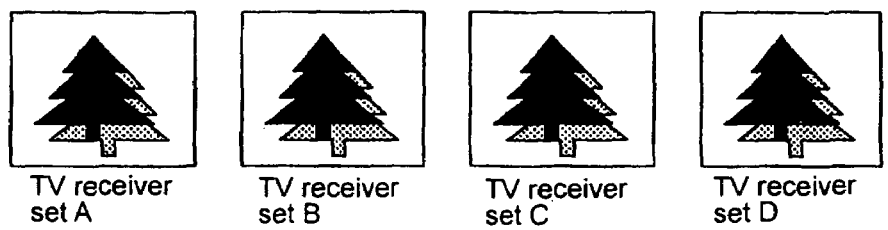
FIG. 8A is a schematic diagram illustrating an example of an image displayed in the apparatus control system in one embodiment of the present invention.

As the operator specifies the IP addresses of TV receiver sets A-D and makes an entry for selecting the first video signal, a remote manipulation instruction that corresponds to the entry is transmitted from PC 2 to TV receiver set A together with a redirection list which includes the IP addresses of TV receiver sets A-D. TV receiver set A displays an image related to the first video signal in accordance with the remote manipulation instruction from PC 2, and redirects the remote manipulation instruction from PC 2 to remaining TV receiver sets B-D. TV receiver sets B-D each display the image related to the first video signal in accordance with the remote manipulation instruction from TV receiver set A. In this way, the same image of trees is displayed on TV receiver sets A-D, as illustrated in FIG. 8A.

Figure 8B:
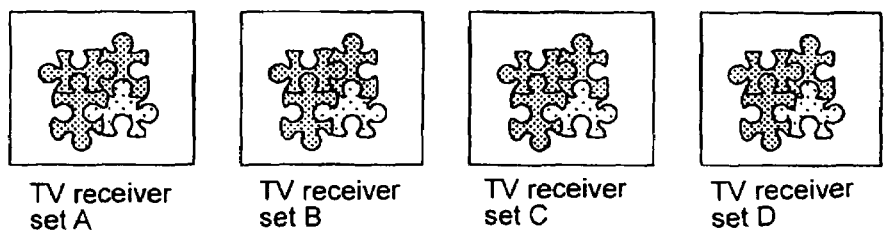
FIG. 8B is a schematic diagram illustrating another example of an image displayed in the apparatus control system in one embodiment of the present invention.

Next, as the operator specifies the IP addresses of TV receiver sets A-D and makes an entry for selecting the second video signal on PC 2, a remote manipulation instruction that corresponds to the entry is transmitted from PC 2 to TV receiver set A together with the redirection list which includes the IP addresses of TV receivers A-D. TV receiver set A displays an image related to the second video signal in accordance with the remote manipulation instruction from PC 2, and redirects the remote manipulation instruction from PC 2 to remaining TV receiver sets B-D. TV receiver sets B-D each display the image related to the second video signal in accordance with the remote manipulation instruction from TV receiver set A. In this way, the same image of jigsaw puzzle is displayed on TV receiver sets A-D, as illustrated in FIG. 8B.

The apparatus control system of the embodiment described above is an example of the present invention, and can be modified in configuration and operation as appropriate. For example, in the configuration illustrated in FIG. 2, devices located on network 1 are not limited to two, but three or more devices may be located on network 1.

Also, two or more of devices located on network 1 may comprise the remote manipulation instruction processing unit illustrated in FIG. 3 or 6.

Further, while the operator directly enters the IP address of a device to which a remote manipulation instruction should be redirected, the apparatus control system may be configured such that PC 2 displays a list of IP addresses of devices to which a remote manipulation instruction may be redirected, thus allowing the operator to select an IP address from the displayed list. In a specific configuration which enables PC 2 to display a list of IP addresses of devices to which a remote manipulation instruction should be redirected, PC 2 may broadcast a packet to all devices on network 1, and each device which has received the packet returns a packet including an IP address set thereto to PC 2. PC 2 displays the list of the IP addresses contained in the packets received from the respective devices on the display.

The present invention can be generally applied to devices which support networks and have a remote manipulation instruction function.

While exemplary embodiments of the present invention have been described using specific terms, such description is for illustrates purposes only, and it is to be understood that changes and variations may be made without departing from the spirit or scope of the following claims.

What is claimed is:

1. An apparatus control system, comprising:
   a plurality of devices located on a network, each of said devices comprising a Hypertext Transfer Protocol (HTTP) server function; and
   a controller which includes a browser function that transmits a remote manipulation instruction to said plurality of devices through said network,
   wherein a device of said plurality of devices comprises a remote manipulation instruction processing unit that executes a corresponding operation in accordance with the remote manipulation instruction from said controller and that redirects the remote manipulation instruction from said controller to an other device in said plurality of devices on said network,
   wherein said other device executes a corresponding operation in accordance with the remote manipulation instruction from said remote manipulation instruction processing unit,
   wherein, with respect to said controller, said device and said other device are connected to said network in parallel,
   wherein said device and said other device perform a same operation,
   wherein said controller transmits, as the remote manipulation instruction, an instruction for switching from one channel to another channel through a channel-up or a channel-down operation,
   wherein said device receives the channel-up or the channel-down operation from a browser and executes the channel-up or the channel-down operation in accordance with the remote manipulation instruction received from said controller,
   wherein said other device executes another corresponding channel-up or channel-down operation in accordance with the remote manipulation instruction that is redirected from said device, and
   wherein said controller transmits to said device a packet which contains a remote manipulation instruction storage section that stores the remote manipulation instruction, and a redirection list storage section that stores a redirection list and comprises a number of IP addresses and a list of the IP addresses.

2. The apparatus control system according to claim 1, wherein said controller transmits to said device the redirection list which includes an address of said other device on said network, and
   wherein said remote manipulation instruction processing unit redirects the remote manipulation instruction with reference to the redirection list received from said controller.

3. The apparatus control system according to claim 2, wherein said remote manipulation instruction processing unit comprises:
   a redirection list holding unit that holds the redirection list received from said controller;
   a redirection list update unit that, responsive to a redirection list received from said controller, updates the redirection list held in said redirection list holding unit based on the received redirection list;
   a remote manipulation instruction redirection determination processing unit that determines a device to which the remote manipulation instruction from said controller should be redirected, with reference to the redirection list held in said redirection list holding unit; and
   a remote manipulation instruction transmission processing unit that redirects the remote manipulation instruction from said controller to the device determined by said remote manipulation instruction redirection determination processing unit, to which the remote manipulation instruction should be redirected.

4. The apparatus control system according to claim 2, wherein said remote manipulation instruction processing unit comprises:
   a remote manipulation instruction redirection determination processing unit that determines a device to which the remote manipulation instruction from said controller should be redirected with reference to the redirection list stored in the redirection list storage section of the packet received from said controller; and
   a remote manipulation instruction transmission processing unit that redirects a remote manipulation instruction stored in the remote manipulation instruction storage section of the packet received from said controller to the device determined by said remote manipulation instruction redirection determination processing unit, to which the remote manipulation instruction should be directed.

5. The apparatus control system according to claim 1, wherein said corresponding operation of said device is the same as said corresponding operation of said other device.

6. The apparatus control system according to claim 1, wherein said other device receives the remote manipulation instruction from said device rather than said controller.

7. The apparatus control system according to claim 1, wherein said remote manipulation instruction is transferred from said controller to said other device without an intervention by a server.

8. The apparatus control system according to claim 1, wherein when the remote manipulation instruction is received from the controller, said device performs one of performing said same operation based on a received remote manipulation instruction, and then redirecting the received remote manipulation instruction to said other device or other devices, and redirecting the received remote manipulation instruction to said other device or the other devices, and then performing said same operation based on the received remote manipulation instruction.

9. An apparatus control method, comprising:
transmitting a remote manipulation instruction from a controller, which includes a browser function, to one of a plurality of devices located on a network, each of said devices comprising a Hypertext Transfer Protocol (HTTP) server function;
in said device:
executing a corresponding operation in accordance with the remote manipulation instruction from said controller; and
redirecting the remote manipulation instruction from said controller to an other device on said network;
at said other device, executing a corresponding operation in accordance with the remote manipulation instruction redirected from said device,
wherein, with respect to said controller, said device and said other device are connected to said network in parallel,
wherein said device and said other device perform a same operation,
wherein said controller transmits, as the remote manipulation instruction, an instruction for switching from one channel to another channel through a channel-up or a channel-down operation,
wherein said device receives the channel-up or the channel-down operation from a browser, said device executing the channel-up or the channel-down operation in accordance with the remote manipulation instruction received from said controller, and
wherein said other device executes another corresponding channel-up or channel-down operation in accordance with the remote manipulation instruction that is redirected from said device; and
at said controller, transmitting to said device a packet which contains a remote manipulation instruction storage section for storing the remote manipulation instruction, and a redirection list storage section for storing the redirection list.

10. The apparatus control method according to claim 9, further comprising:
at said controller, transmitting to said device the redirection list which includes an address of said other device on said network, and
at said one device, redirecting the remote manipulation instruction with reference to the redirection list received from said controller.

11. The apparatus control method according to claim 10, wherein the redirection of the remote manipulation instruction by said device includes:
holding the redirection list received from said controller in a redirection list holding unit;
upon receipt of a new redirection list from said controller, updating the redirection list held in said redirection list holding unit based on the received redirection list;
determining a device to which the remote manipulation instruction from said controller should be redirected with reference to the redirection list held in said redirection list holding unit; and
redirecting the remote manipulation instruction from said controller to the device determined by said remote manipulation instruction redirection determination processing unit, to which the remote manipulation instruction should be redirected.

12. The apparatus control method according to claim 10, wherein the redirection of the remote manipulation instruction by said device includes:
determining a device to which the remote manipulation instruction from said controller should be redirected with reference to the redirection list stored in the redirection list storage section of the packet received from said controller, and redirecting the remote manipulation instruction stored in the remote manipulation instruction storage section of the packet received from said controller to the device determined by said remote manipulation instruction redirection determination processing unit, to which the remote manipulation instruction should be directed.

13. The apparatus control method according to claim 5, wherein said other device receives the remote manipulation instruction from said device rather than said controller, and
wherein said remote manipulation instruction is transferred from said controller to said other device without an intervention by a server.

14. The apparatus control method according to claim 9, wherein when the remote manipulation instruction is received from the controller, said device performs one of performing said same operation based on a received remote manipulation instruction, and then redirecting the received remote manipulation instruction to said other device or other devices, and redirecting the received remote manipulation instruction to said other device or the other devices, and then performing said same operation based on the received remote manipulation instruction.

15. An electronic device communicably connected to a controller, which includes a browser function, and another device through a network, said electronic device and said another device including a Hypertext Transfer Protocol (HTTP) server function, said electronic device comprising:
a remote manipulation instruction execution unit that executes a corresponding operation in accordance with a remote manipulation instruction from said controller;
a redirection list holding unit that holds a redirection list which is received from said controller and which includes an address of an other device on said network;
a redirection list update unit that receives a redirection list received from said controller and updates the redirection list held in said redirection list holding unit based on the received redirection list;
a remote manipulation instruction redirection determination processing unit that determines a device to which the remote manipulation instruction from said controller should be redirected with reference to the redirection list held in said redirection list holding unit; and a remote manipulation instruction transmission processing unit that redirects the remote manipulation instruction from said controller to the device determined by said remote manipulation instruction redirection determination processing unit, to which the remote manipulation instruction should be redirected, wherein, with respect to said controller, said electronic device and the device determined by said remote manipulation instruction redirection determination processing unit are connected to said network in parallel, wherein said electronic device and the device determined by said remote manipulation instruction redirection determination processing unit perform a same operation, wherein said controller transmits, as the remote manipulation instruction, an instruction for switching from one channel to another channel through a channel-up or a channel-down operation, wherein said electronic device receives the channel-up or the channel-down operation from a browser, said electronic device executing the channel-up or the channel-down operation in accordance with the remote manipulation instruction from said controller, wherein said another device executes another corresponding channel-up or channel-down operation in accordance with the remote manipulation instruction that is redirected from said electronic device, and wherein said controller transmits to said electronic device a packet which contains a remote manipulation instruction storage section that stores the remote manipulation instruction, and a redirection list storage section that stores a redirection list and comprises a number of IP addresses and a list of the IP addresses.

16. The electronic device according to claim 15, wherein when the remote manipulation instruction is received from the controller, said electronic device performs one of performing said same operation based on a received remote manipulation instruction, and then redirecting the received remote manipulation instruction to said device determined by said remote manipulation instruction redirection determination processing unit or other devices, and redirecting the received remote manipulation instruction to said device determined by said remote manipulation instruction redirection determination processing unit or the other devices, and then performing said same operation based on the received remote manipulation instruction.

17. An electronic device communicably connected to a controller, which includes a browser function, and another device through a network, said electronic device and said another device including a Hypertext Transfer Protocol (HTTP) server function, said electronic device comprising:

a remote manipulation instruction execution processing unit that receives a packet, which includes a remote manipulation instruction storage section for storing a remote manipulation instruction and a redirection list storage section for storing a redirection list, from said controller, and that executes a corresponding operation in accordance with the remote manipulation instruction stored in the remote manipulation instruction storage section of the received packet;

a remote manipulation instruction redirection determination processing unit that determines a device to which the remote manipulation instruction from said controller should be redirected with reference to the redirection list stored in the redirection list storage section of the received packet; and a remote manipulation instruction transmission processing unit that redirects the remote manipulation instruction stored in the remote manipulation instruction storage section of the received packet to the device determined by said remote manipulation instruction redirection determination processing unit, to which the remote manipulation instruction should be redirected, wherein, with respect to said controller, said electronic device and the device determined by said remote manipulation instruction redirection determination processing unit are connected to said network in parallel, wherein said electronic device and the device determined by said remote manipulation instruction redirection determination processing unit perform a same operation, wherein said controller transmits, as the remote manipulation instruction, an instruction for switching from one channel to another channel through a channel-up or a channel-down operation, wherein said electronic device receives the channel-up or the channel-down operation from a browser, said electronic device executing the channel-up or the channel-down operation in accordance with the remote manipulation instruction from said controller, wherein said another device executes another corresponding channel-up or channel-down operation in accordance with the remote manipulation instruction that is redirected from said electronic device, and wherein said controller transmits to said electronic device a packet which contains a remote manipulation instruction storage section that stores the remote manipulation instruction, and a redirection list storage section that stores a redirection list and comprises a number of IP addresses and a list of the IP addresses.

18. The electronic device according to claim 17, wherein when the remote manipulation instruction is received from the controller, said electronic device performs one of performing said same operation based on a received remote manipulation instruction, and then redirecting the received remote manipulation instruction to said device determined by said remote manipulation instruction redirection determination processing unit or other devices, and redirecting the received remote manipulation instruction to said device determined by said remote manipulation instruction redirection determination processing unit or the other devices, and then performing said same operation based on the received remote manipulation instruction.

19. An apparatus control method, comprising:

transmitting, by a controller, which includes a browser function, a remote manipulation instruction to a device in a plurality of devices located on a network, each of said plurality of devices comprising a Hypertext Transfer Protocol (HTTP) server function;

executing, by said device, a corresponding operation in accordance with the remote manipulation instruction from said controller, and redirecting, by said device, the remote manipulation instruction from said controller to an other device in said plurality of devices on said network;

executing, by said other device a corresponding operation in accordance with the remote manipulation instruction redirected by said device, wherein, with respect to said controller, said device and said other device are connected to said network in parallel, wherein said device and said other device perform a same operation, wherein said controller transmits, as the remote manipulation instruction, an instruction for switching from one channel to another channel through a channel-up or a channel-down operation, wherein said device receives the channel-up or the channel-down operation from a browser, said device executing the channel-up or the channel-down operation in accordance with the remote manipulation instruction from said controller, and wherein said other device executes another corresponding channel-up or channel- down operation in accordance with the remote manipulation instruction that is redirected from said device; and at said controller, transmitting to said device a packet which contains a remote manipulation instruction storage section for storing the remote manipulation instruction, and a redirection list storage section for storing the redirection list.

20. The apparatus control method according to claim 19, wherein when the remote manipulation instruction is received from the controller, said device performs one of performing said same operation based on a received remote manipulation instruction, and then redirecting the received remote manipulation instruction to said other device or other devices, and redirecting the received remote manipulation instruction to said other device or the other devices, and then performing said same operation based on the received remote manipulation instruction.

* * * * *